United States Patent [19]

Sakino et al.

[11] Patent Number: 4,744,675

[45] Date of Patent: May 17, 1988

[54] MOVING MECHANISM

[75] Inventors: Shigeo Sakino; Mahito Negishi, both of Yokohama; Koichi Matsushita, Chiba; Michio Horikoshi, Ushikumachi; Makoto Higomura, Yokohami, all of Japan

[73] Assignee: Canon Kabushiki Kaisha, Tokyo, Japan

[21] Appl. No.: 3,769

[22] Filed: Jan. 16, 1987

[30] Foreign Application Priority Data

Jan. 21, 1986 [JP] Japan .................. 61-008925

[51] Int. Cl.[4] ............... F16C 32/06; F16C 29/02
[52] U.S. Cl. ...................................... 384/12; 384/13
[58] Field of Search .................................. 384/12, 13

[56] References Cited

U.S. PATENT DOCUMENTS

| | | | |
|---|---|---|---|
| 3,512,848 | 5/1970 | Uhtenwoldt | 384/12 |
| 4,517,852 | 5/1985 | Kawakami et al. | 384/13 X |
| 4,648,724 | 3/1987 | Sugiyama et al. | 384/12 X |
| 4,653,408 | 3/1987 | Nagashima et al. | 384/12 X |

Primary Examiner—Stuart S. Levy
Assistant Examiner—Thomas R. Hannon
Attorney, Agent, or Firm—Fitzpatrick, Cella, Harper & Scinto

[57] ABSTRACT

A moving mechanism for relatively moving first and second members, the mechanism comprising a first fluid discharging portion provided on the first member, for relatively supporting the second member by use of a static pressure, and a second fluid discharging portion operable to produce a static pressure that is effective to apply, to the first member, a force contributable to prevent any deformation of the first member due to the static pressure caused by the first fluid discharging portion.

3 Claims, 7 Drawing Sheets

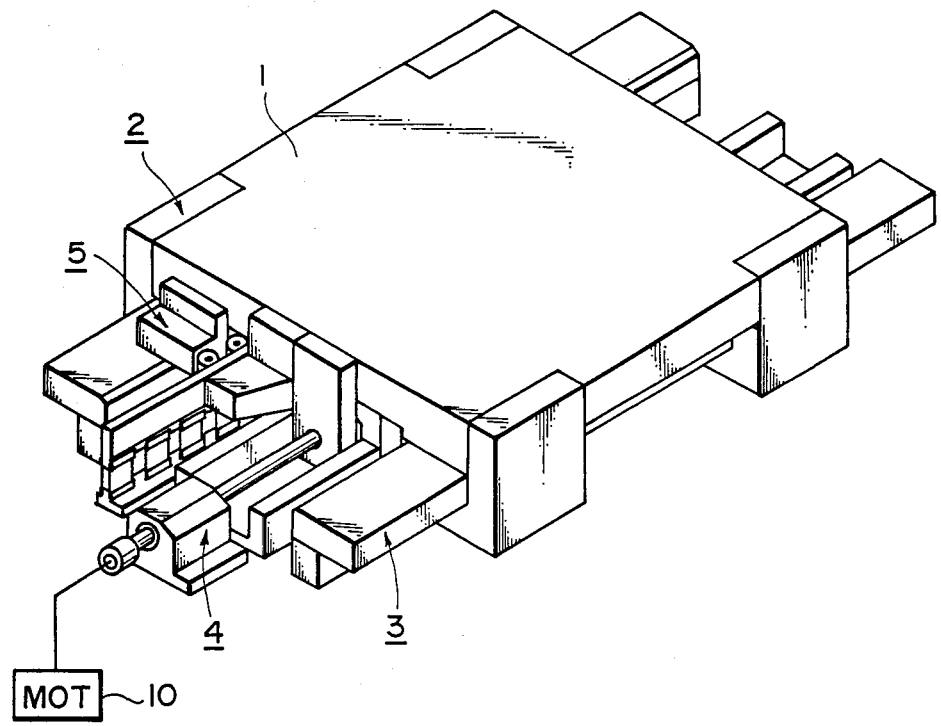
F I G. 2A
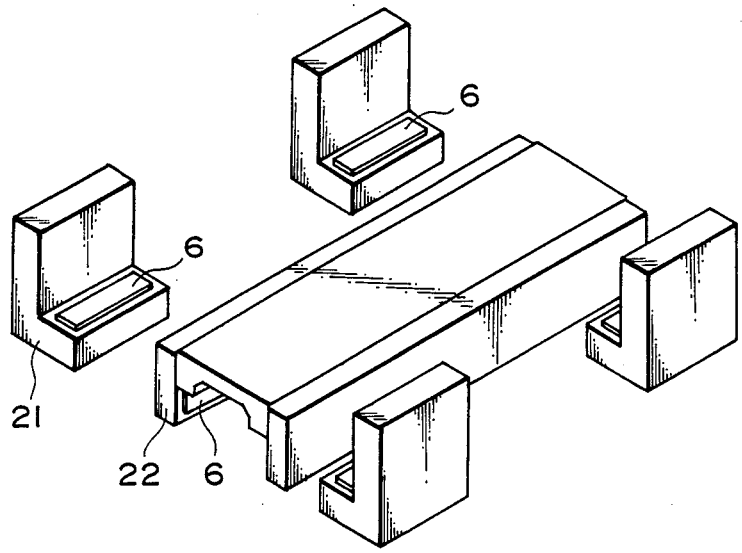
F I G. 2C

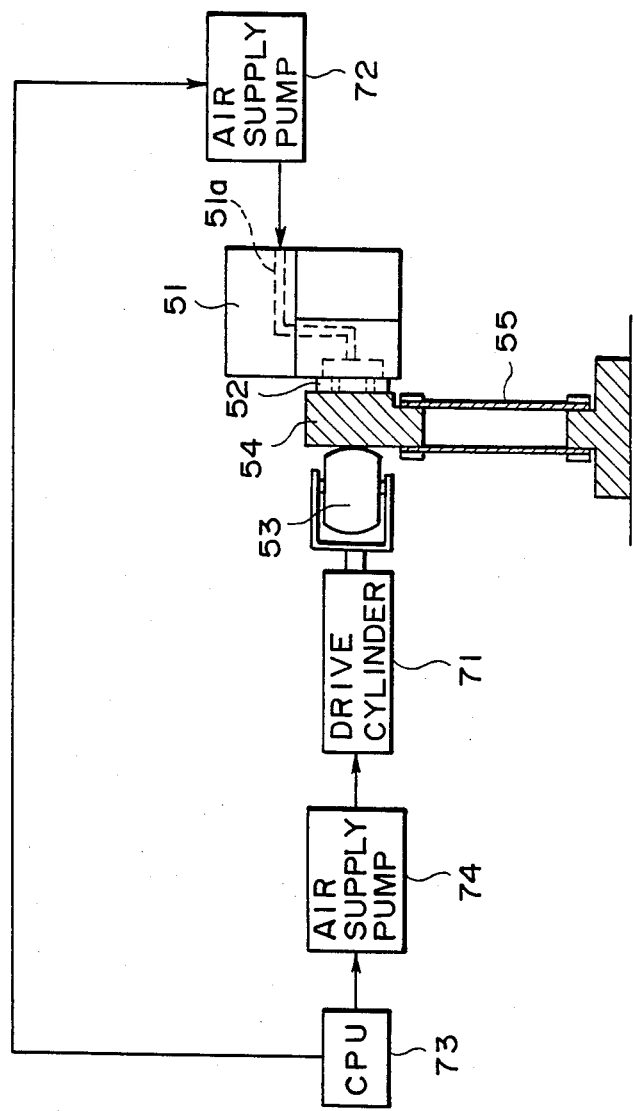
F I G. 7

MOVING MECHANISM

FIELD OF THE INVENTION AND RELATED ART

This invention relates to a moving mechanism and more particularly, to a movement guiding device for allowing relative movement of a member such as a sample feeding stage along a path defined on another member such as a support base. As a typical example, the invention provides a movement guiding device which is suited for a sample feeding system in a step-and-repeat type reduction projection exposure apparatus wherein a sample such as a semiconductor wafer is repeatedly and alternately moved at a higher speed and stopped with higher positional accuracy during the manufacture of semiconductor devices such as integrated circuits.

Step-and-repeat type reduction projection exposure apparatus are prevalently used in the manufacture of semiconductor devices such as integrated circuits (ICs), large scaled integrated circuits (LSIs), etc. In such exposure apparatus, it is required that reticle patterns or mask patterns are frequently photoprinted on a wafer in a matrix fashion. Also, when a mask pattern is photoprinted on a pattern or patterns which have already been printed on the wafer, it must be superimposed with high pattern overlay accuracy.

Further, for improved working efficiency, the step-and-repeat operation should be executed rapidly. In order to meet these requirements, a wafer stage moving system for moving the wafer in a plane of X-Y coordinates should have a capability of quick start/stop and high stop-position accuracy. Many attempts have been made to improve moving and guiding characteristics of a movement guiding device for the wafer stage. The wafer stage (including the movement guiding system therefor) is usually called "X-Y stage".

FIG. 1A shows the basic structure of a known type movement guiding device in the feeding system called "X-Y stage".

In FIG. 1A, denoted by a reference numeral 101 is a top plate (slider); by 102, a stage surface; by 103, bearing-element supports; by 104, static-pressure bearing elements mounted on the supports 103; and by 105, guiding rails which cooperate with the static-pressure bearings 104 to guide the movement of the top plate 101 in a particular direction while confining displacement of the same in vertical and horizontal directions other than such particular direction. In the illustrated example, the top plate 101 is smoothly guided along a path extending in a direction perpendicular to the plane of the drawing. Denoted at 106 is a semi-floating brake bearing element made of resin; at 107, a friction or sliding plate which is slidably contactable with the bearing element 106; and at 108, a pressing roller unit which is disposed so that the friction plate 107 is sandwiched between one or more rollers of the unit and the brake bearing element 106. By adjusting or controlling the pressing force of the pressing roller unit 108, an apparent frictional coefficient, in a moving direction, at the frictionally sliding portion between the brake bearing element 106 and the friction plate 107 is set or variably controlled as desired. A reference numeral 109 denotes the center of gravity of the stage portion. The stage feeding system of an exposure apparatus usually comprises a movable table (stage) provided with a movement guiding device such as illustrated in FIG. 1A and, additionally, a driving mechanism as well as a drive transmitting mechanism. Plural movement guiding devices together with driving mechanisms and drive transmitting mechanisms are combined to provide a stage feeding system capable of moving the stage in orthogonal X and Y directions in the X-Y coordinate system.

The inventors of the subject application have found that the movement guiding device of the type such as illustrated in FIG. 1A involves various inconveniences, as follows:

(1) The device is tall and therefore, bulky.

(2) The increased height of the device leads to lengthening the distance between the center of gravity 109 (FIG. 1A) and the surface of a wafer when it is carried on the table 101. This is very undesirable because any minute rotational vibration of the stage about the center of gravity results in amplified vibration at the wafer surface.

(3) Each of the static-pressure bearing elements 104 discharges pressurized air so as to floatingly support a surface which is opposed thereto. By this air discharging, a force is applied to each of the supports 103 which force acts to move the support 103 away from the guide rail 105. Thus, by this force, the support 103 deforms in the manner as illustrated in FIG. 1B, with the result that unpreferable inclination and enlargement of spacing occur between the bearing element surface and the guide rail surface. This leads to deterioration of the characteristics of the bearing elements 104 and, therefore, desired bearing rigidity is not attainable.

(4) The sliding contact at the semi-floating bearing element 106 tends to scatter foreign particles which enter into the bearing portion and damage or deteriorate the bearing. Also, adhesion of these particles to the wafer adversely affects the photoprinting.

(5) Each guide unit is arranged to confine deviation of the wafer stage in two orthogonal directions (i.e. dual-direction confining type). This leads to that both the degree of parallelism and the degree of parpendicularity of the surfaces of each of the guide 105 and the support 103 must be adjusted exactly. Such adjustment is time-consuming.

SUMMARY OF THE INVENTION

It is accordingly a primary object of the present invention to provide an improved moving mechanism which is free from the inconveniences described above.

It is another object of the present invention to provide an improved moving mechanism which allows reduction in height of a workpiece carrying device for movably carrying thereon a workpiece such as a semiconductor wafer.

It is a further object of the present invention to provide an improved moving mechanism having increased bearing rigidity, with the result that the mechanism is resistive to any change in load or an external force thus reducing any change in the attitude of a movable stage.

It is a still another object of the present invention to provide an improved moving mechanism for precisely moving a movable stage, which mechanism is effective to minimize deterioration of the attitude accuracy of the stage in a moving direction, a horizontal direction, a vertical direction and rotational directions (rolling, pitching and yawing) and also is effective to produce a sufficient damping or attenuation force effectively acting against stage vibration in each of the aforesaid directions.

Briefly, in accordance with one aspect of the present invention, there is provided a moving mechanism for relatively moving first and second members, said mechanism comprising:

first fluid discharging means provided on the first member, for relatively supporting the second member by use of a static pressure; and second fluid discharging means operable to produce a static pressure that is effective to apply, to the first member, a force contributable to prevent any deformation of the first member due to the static pressure caused by said first fluid discharging means.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 2A is a perspective view schematically and diagrammatically showing a general structure prior art movement guiding device according to one embodiment of the present invention.

FIG. 2C is a perspective view schematically showing a bearing-element mounting unit whose members are mounted on a top plate (table).

FIG. 7 is a schematic and diagrammatic view showing the structure of the sliding unit of FIG. 5.

DESCRIPTION OF THE PREFERRED EMBODIMENTS

Figure 1A:
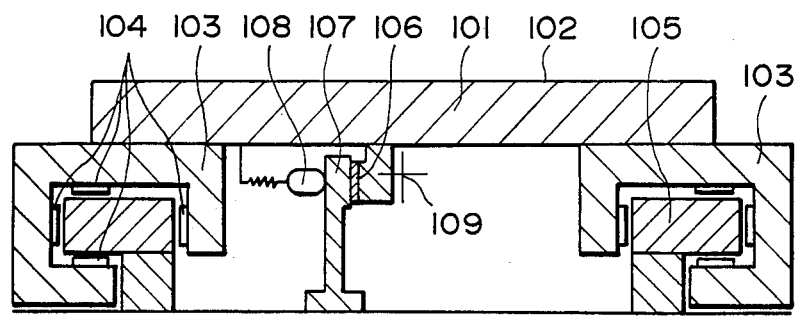
FIG. 1A is a sectional view schematically showing a general structure of a movement guiding device of conventional type.

Referring to FIG. 2A, there is shown a movement guiding device according to an embodiment of the present invention. As shown in this Figure, the device includes a top plate (slider) 1 on which a workpiece such as a semiconductor wafer is to be carried. Denoted generally by numeral 2 is a hydrostatic or static-pressure bearing-element mounting unit which is fixedly secured to the slider 1. Also, reference numeral 3 generally denotes a guide unit for guiding movement of the slider 1. Reference numeral 4 generally denotes a feeding-mechanism unit including a driving motor 10, for driving or moving the slider 1. Further, reference numeral 5 generally denotes a sliding unit arranged to apply, to the slider 1, frictional resistance to the movement of the slider 1.

FIG. 2C shows the positional relation of the members of the bearing-element mounting unit 2 which are fixedly secured to the slider 1. As shown, the mounting unit 2 includes four bearing-element mounting or supporting plates 21 for mounting, respectively, four bearing elements 6 which are operable to support or confine the slider 1 in an up-and-down or vertical direction; by 22, two opposed bearing-element mounting or supporting plates for mounting, respectively, two bearing elements 6 which are operable to support or confine the slider 1 in a lateral or horizontal direction. Each of the bearing elements 6 is made of a porous material and is effective to support the slider 1 by static pressure. Each of the mounting plates 21 and 22 is provided with air-pressure supplying passages and ports, not shown, for supplying air pressures to the static-pressure bearing elements 6, such that air is supplied under pressure to back sides of the bearing elements 6 and are discharged from here to produce static pressures between such surfaces and the surfaces opposed to them.

Figure 2B:
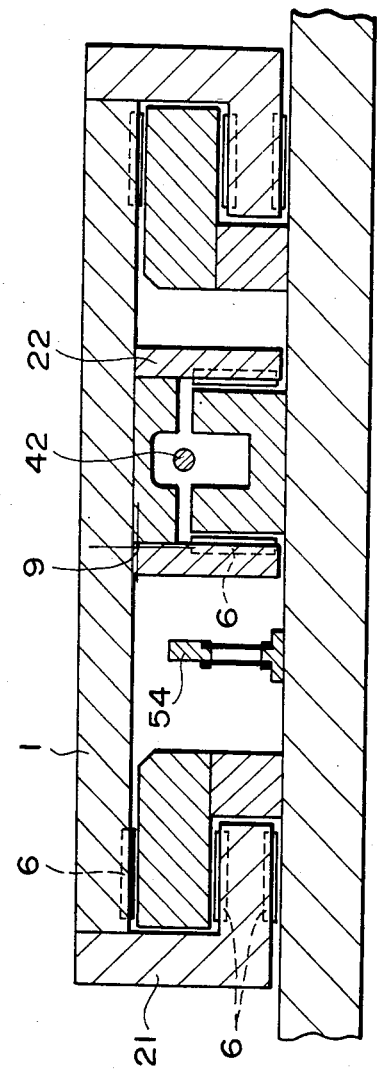
FIG. 2B is a sectional view of the device of FIG. 2A.
Figure 3:
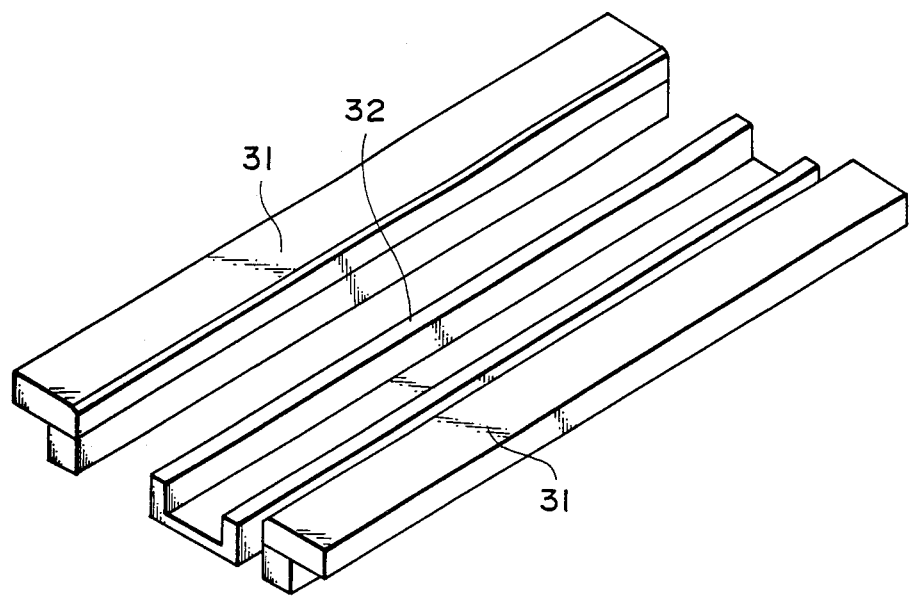
FIG. 3 is a perspective view schematically showing guide rails of the device of FIG. 2A.

FIG. 3 shows guide rails of the guide unit 3. As shown, the guide unit 3 includes two guide rails 31 which are cooperable with the bearing elements 6 mounted on the mounting plates 21 so as to confine displacement of the slider 1 in the vertical direction while guiding the movement of the slider 1 in a direction which is perpendicular to the sheet of the drawing of FIG. 2B. Also, the guide unit 3 includes a guide rail 32 which is cooperable with the bearing elements 6 mounted on the mounting plates 22 so as to confine displacement of the slider 1 in a lateral or horizontal direction perpendicular to the moving direction of the slider 1. All the guide rails 31 and 32 are fixedly secured to a base and have surfaces opposed to corresponding bearing elements 6. As described, the static pressures are produced between the bearing elements 6 and the surfaces of the guide rails 31 and 32 opposed to the bearing elements. By these static pressures, the slider 1 and the mounting unit 2 are guidingly supported. The positional relation between the bearing-element mounting unit 2 and the guide unit 3 is best seen in FIG. 2B.

Figure 4:
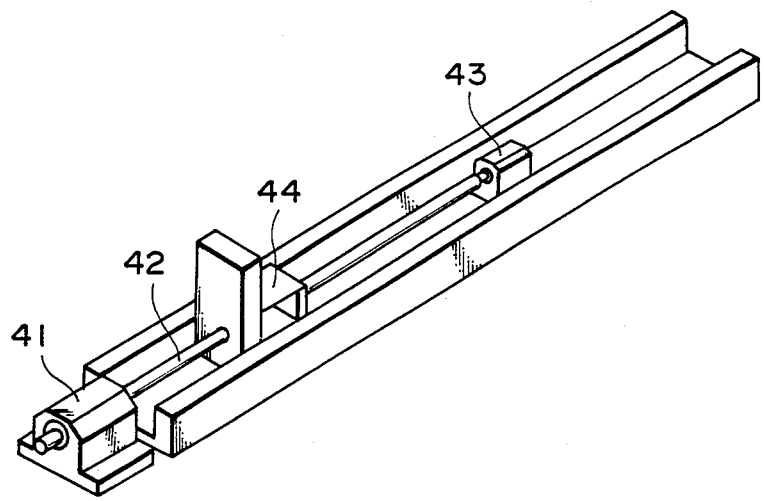
FIG. 4 is a perspective view schematically showing a stage feeding unit of the device of FIG. 2A.

FIG. 4 shows the structure of the feeding-mechanism unit 4 for moving the stage or slider 1. As shown, the unit includes ball-bearing housings 41 and 43 mounted on the base and the guide rail 32, respectively; a screw 42 rotatably supported by the housings 41 and 43 and engaging a ball nut (not shown), the rotation of screw 42 being effective to move the slider 1 with the aid of the ball nut; and leaf springs 44 for coupling the ball nut and the slider 1 while absorbing any deflecting moment of the screw 42. Details of the leaf-spring assembly 44 are disclosed in U.S. patent application, Ser. No. 850,079 filed Apr. 9, 1986.

Figure 5:
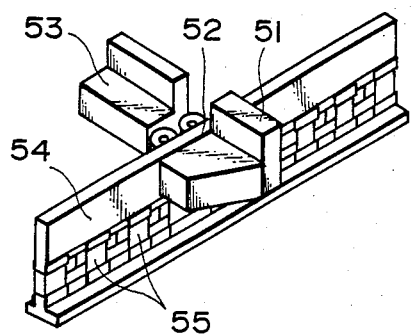
FIG. 5 is a perspective view schematically showing a sliding unit of the device of FIG. 2A.

FIG. 5 shows the sliding unit 5 which comprises, as shown, a sliding-element supporting block 51 which is fixedly secured to the slider 1; a sliding element 52 which is in the form of a semi-floating bearing element made of ceramic; a pre-load roller unit 53 having rollers; a driving cylinder 71 mounted on the slider 1, for urging the rollers of the pre-load roller unit 53; a sliding plate 54 which is made of ceramic and is engageable with the sliding element 52 and rollers of the unit 53 for relative movement therebetween; and leaf springs 55 mounted on the base, for supporting the sliding plate 54. As will be described later in detail, the leaf springs 55 are flexible so as to allow displacement of the sliding plate 54 in a particular direction and prevent the sliding plate 54 from adversely affecting the guiding accuracy of the guide unit 3.

Referring now to FIGS. 2A-7, the operation of the device of the present embodiment will be described.

Figure 1B:
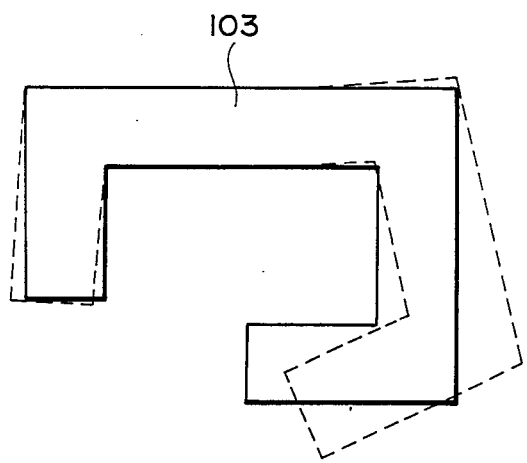
FIG. 1B is a schematic view showing unpreferable deformation of a support member on which static-pressure bearing elements are mounted.
Figure 6:
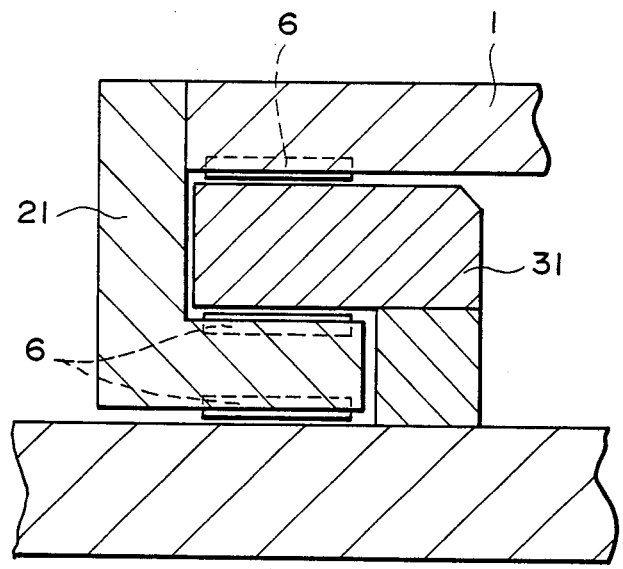
FIG. 6 is a fragmentary and sectional view showing details of a vertically-confining bearing assembly used in the device of FIG. 2A.

The slider 1 is floated away from the guide rails 31 and 32 by means of the static pressures produced by the bearing elements 6. Each of these bearing elements 6 is arranged to discharge an air, under pressure, toward the surface which is opposed to the bearing element. As is best seen in FIG. 6, the bearing elements which are effective to confine the slider 1 with respect to the vertical direction are arranged in a three-stage structure. Therefore, higher bearing rigidity is attainable as compared with the conventional type bearing assembly such as illustrated in FIG. 1A. Further, in the present embodiment, the lowermost bearing element 6 mounted on the bottom of the mounting plate 21 so as to be opposed to the surface of the base is effective to confine the mounting plate 21 to prevent any deformation thereof, as illustrated in FIG. 1B. More specifically, it will be readily seen from FIG. 6 that the intermediate bearing element 6 causes a force which is applied to the mounting plate 21 of L-section to deform it in a clockwise direction about the connecting point between the mounting plate 21 and the slider 1, as viewed in FIG. 6. Such deforming force is satisfactorily cancelled by the lowermost bearing element 6. That is, the lowermost bearing 6 disposed between the bottom surface of the mounting plate 21 and the base produces a static pressure therebetween, which static pressure produces a force that is applied to the mounting plate 21 in a direction opposite to the direction of the force caused by the intermediate bearing element 6. As a result, undesirable deformation of the mounting plate 21 is effectively prevented, such that superior bearing characteristics are retained. Also, with respect to the bearing rigidity in the lateral direction, it is assured by providing the two static-pressure bearing elements 6 between the guide 32 and the supporting plates 22.

As described and illustrated, the movement guiding device of the present embodiment is arranged such that the vertical-direction confining guide assembly and the lateral-direction confining guide assembly are provided separately. In order to stably support the movable member such as the slider 1 with respect to the vertical direction, the vertical-direction confining guide assembly must have sufficient structural rigidity. For this purpose, each of the guide rails 31 and the mounting plates 21 should have a vertical thickness which is sufficiently large. As for the lateral-direction confining guide assembly, however, it is necessary to provide sufficient bearing rigidity in the lateral direction. And, for this purpose, each of the static-pressure bearing elements 6 mounted on the supporting plates 22 must have a size which is sufficiently large to provide the necessary air-pressure supply. Also, the surfaces of the guide rail 32, opposed to these bearing elements 6, must have a height which is larger than the height of the opposed bearing element 6. As a result, the height of the guide 32 surface, in the vertical direction, necessary for assuring sufficient bearing rigidity in the lateral direction is usually larger than the thickness of the guide rail 31. Consequently, in the dual-direction confining guide assembly, such as illustrated in FIG. 1A, wherein the guide rail has guide surfaces confiningly supporting the slider in both the vertical and lateral directions, should employ such a guide rail whose thickness in the vertical direction is greater than the thickness of a vertical-direction confining guide rail which thickness is necessary for providing sufficient structural rigidity. In other words, the thickness of the guide rail 105 shown in FIG. 1A corresponds to the height of the lateral-direction confining bearing element 6.

In the present embodiment, as described and illustrated, the vertical-direction confining guide assembly and the lateral-direction confining guide assembly are separately provided. As a result, the lateral-direction supporting bearing elements 6 and the guide rail therefor can be disposed within the range of the total thickness of the vertical-direction confining guide rail 31 and the mounting plate 21, as seen from FIG. 2B. Therefore, the overall height of the stage device can be reduced significantly, as compared with the stage device of FIG. 1A including the dual-direction confining guide assembly.

Further, in the present embodiment, the provision of particular static-pressure bearing elements, which are effective to confine the mounting plates 21 so as to prevent deformation thereof, allows use of a member, as the mounting plate 21, that has low structural rigidity. Accordingly, the thickness of the mounting plate can be reduced, which is also contributable to the reduction of the height of the stage device.

Moreover, as shown in FIG. 6, each of the bearing elements 6 of this embodiment is partially embedded in the mounting plates 21 and the slider 1. This allows further reduction in the height of the device, without reducing the thickness of the bearing element 6 which would result in degradation of the bearing characteristics. Further, each bearing element 6 may be made of a porous ceramic material. In such case, the bearing element has reduced air-discharging pores, which is desirable because an improved orifice effect is attainable such that a larger static pressure is obtainable over a wider range. As a result, the bearing rigidity can be improved significantly, such that the amount of change in attitude of the stage due to any change in the load or any external force can be reduced.

The slider 1 floatingly supported by the static-pressure bearing elements 6 is driven by means of the driving unit 4 including a driving motor 10. The driving force from the motor 10 is transmitted to the slider 1 by way of the screw 42 having ends rotatably supported by ball-bearing assemblies. The leaf springs 44, four springs in this embodiment, are provided so as to absorb any deflection moment of the screw 42. Also, the movement guiding device of the present embodiment is arranged so that the screw 42 extends in the vicinity of the center of gravity, denoted at 9 in FIG. 2B. With this arrangement, the thrust for propelling the slider 1 is applied to a portion near the center 9 of gravity, with the result that unpreferable vibration of the slider 1 can be effectively prevented or suppressed. The reduction of height of the guide unit, described hereinbefore, is effective to reduce the distance between the slider 1 and the center of gravity. Also in this respect, the occurrence of vibration is effectively prevented.

It is however possible that, due to any resilient vibration of the screw 42 in its axial direction or for any other reason, the slider 1 is vibrated. In order to effectively attenuate such vibration, a frictional force generating semi-floating unit (sliding unit) 5 such as illustrated in FIGS. 5 and 7 is provided. To avoid the scatter of foreign particles at the sliding contact portion, the sliding element 52 of the semi-floating unit 5 is made of ceramic. Also, the sliding element 52 is arranged to be supplied with an air (air pressure) by way of an air supply passage 51a formed in the sliding-element supporting block 51. The air pressure is discharged from the sliding surface of the sliding element 52 to the mating surface of the sliding plate 54. The friction force is controlled by controlling the preload at the pressing rollers 53 and the air pressure applied to the sliding element 52. For this purpose, an air-pressure supplying pump 74 is provided to control the driving cylinder 71 to thereby control the pressing force of the pressing rollers 53. Also, another air-pressure supplying pump 74 controls the supply of air pressure to the sliding element 52. Each of these supply pumps 72 and 74 are controlled by instruction signals from a central processing unit 73.

The central processing unit 73 controls the pumps 72 and 74 in such manner that, at the time of start of movement of the slider (stage) 1, the air pressure to be supplied to the sliding element 52 is increased while the pressing force to the pressing roller 53 from the driving cylinder 71 is reduced. By doing so, resistance to the stage 1 movement due to the friction force from the sliding plate 54 is reduced, whereby higher-speed movement of the stage is allowed. On the other hand, at the time of start of the control of stopping of the stage 1, for example when the stage reaches a position in the neighborhood of its target or desired stop position (such that position servo control should be established in place of speed servo control), the central processing unit 73 operates to control the air-pressure supplying pump 72 so as to reduce the air pressure to be supplied to the sliding element 52 while, at the same time, controls the air-pressure supplying pump 74 so as to increase the pressing force of the pressing rollers 53. By this, an increased friction force is produced between the sliding element 52 and the sliding plate 54, whereby the stage can be stopped while efficiently attenuating or damping the vibration thereof.

The sliding plate 54 made of ceramic is supported by the leaf springs 55 in such manner that the flexibility of the leaf springs 55 allows minute displacement of the sliding plate 54 in a direction perpendicular to the moving direction of the stage and in a substantially horizontal plane. This is effective to avoid any change in the friction force due to the change, in magnitude, of the pre-load resulting from any deformation of the sliding plate 54, errors in the straightness of the guide rail. Also, it effectively prevents any error in the accuracy of configuration of the sliding plate 54 from adversely affecting the moving accuracy of the stage 1.

While a single sliding element 52 is illustrated in FIG. 7, plural sliding elements may be provided. For example, two sliding elements may be mounted on the slider 1 at positions along the sliding plate 54, the sliding elements having sliding surfaces which are slidably contactable with the right-hand guide surface of the sliding plate 54. Also, the sliding element 52 may be provided by an integral structure having plural sliding surfaces. Provision of plural sliding surfaces slidably contactable with the guide surface is preferable.

Also, while a single pressing roller unit 53 is illustrated in FIG. 7, two pressing roller units may be disposed along the sliding plate 54. It is also possible that a single pressing roller unit is disposed between two sliding elements. Of course, three or more pressing roller units may be provided.

Figure 8:
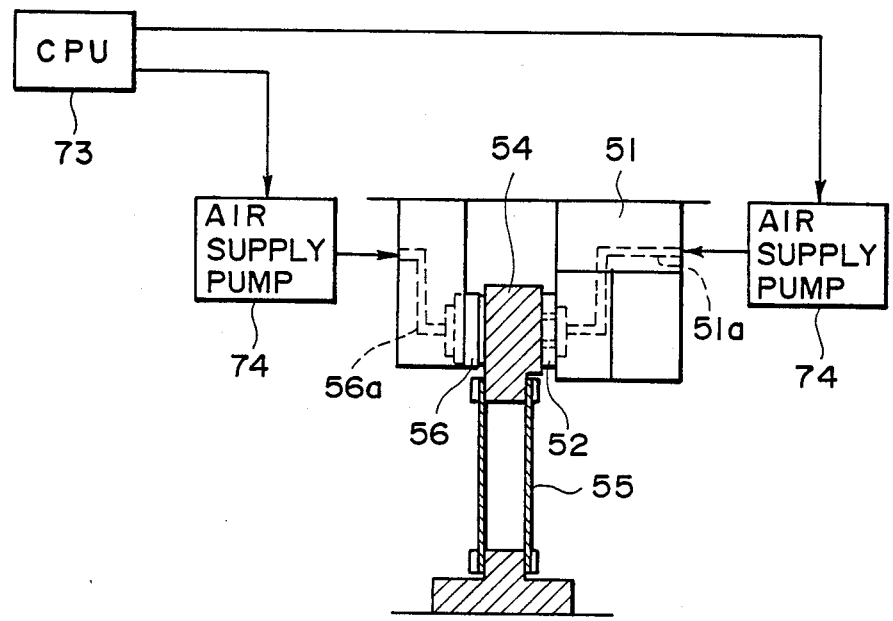
FIG. 8 is a view similar to FIG. 7, but showing a modified form of the sliding unit.

FIG. 8 shows a modified form of the sliding unit 5. In this example, the pressing rollers 53 shown in FIG. 7 are replaced by a static-pressure bearing element 56 made of a porous ceramic material. The friction force is increased by urging the sliding plate 54 toward the sliding element 52 by means of the air discharged from the bearing element 56 by way of a supply passage 56a. More specifically, the friction force is controlled by controlling, under the influence of instruction signals supplied from the central processing unit 73, the air pressure to be supplied to the bearing element 56 from the air-pressure supplying pump 75 and the air pressure to be supplied to the sliding element 52 from the air-pressure supplying pump 72. At the time of start of movement of the stage, the central processing unit 73 operates to control the pump 72 so as to increase the air pressure to be supplied to the sliding element 52 while, on the other hand, controls the pump 75 so as to reduce the air pressure to be supplied to the bearing element 56. By this, the sliding element 52 and the sliding plate 54 are brought into a non-contact relation. At this time, a sufficient air pressure is supplied from the pump 72 so as to prevent contact of the bearing element 56 with the sliding plate 54. Since no resistance, due to friction, is applied to the stage, high-speed movement thereof is allowed. At the time of start of control of the stopping, the pumps 72 and 75 are simultaneously controlled so as to reduce the air pressure to be supplied to the sliding element 52 and increase the air pressure to be supplied to the bearing element 56. By this, the sliding element 52 and the sliding plate 54 are brought into contact with each other so that a sufficient friction force is produced therebetween. This efficiently attenuates the vibration of the stage and reduces the time necessary for stopping the stage. Further, the structure of the sliding unit of the FIG. 8 example is effective to avoid generation of foreign particles at the roller portion and generation of any friction force of the roller in the sliding direction (vertical direction).

Figure 9:
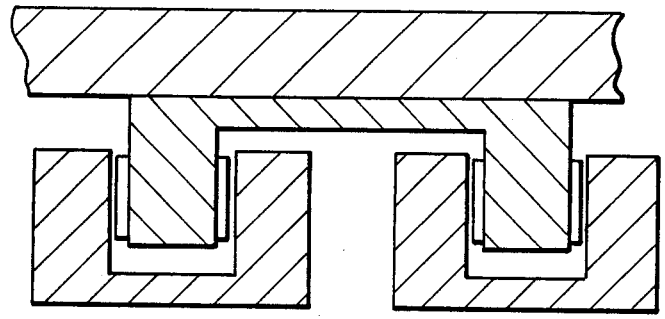
FIG. 9 is a fragmented sectional view showing a modified form of a laterally-confining bearing assembly used in a movement guiding device according to an embodiment of the present invention.

The lateral-direction confining bearing assembly may be modified in the manner such as illustrated in FIG. 9. That is, in the FIG. 9 example, the lateral-direction confining guide bearing assembly has a double-supporting structure, comprising two bearing sub-assemblies. With this arrangement, undesirable deformation of the bearing-element mounting plate can be prevented and, in addition thereto, the bearing rigidity can be improved.

It will be readily understood that the embodiments of the present invention described hereinbefore provide various advantageous effects such as follows:

(1) Use of a static-pressure guide assembly avoids generation of foreign particles due to any contact such as sliding contact, rolling contact, etc.

(2) Separately providing the vertical-direction confining guide assembly and the lateral-direction confining guide assembly allows substantial reduction in the height of the stage device. Also, this avoids the necessity of adjustment of the perpendicularity of the surfaces of the guide. Namely, according to the embodiments of the present invention, it is not necessary to adjust the perpendicularity of the vertically extending surface and the horizontally extending surface of each of the vertical-direction confining guide rails, the vertical-direction confining bearing-element mounting plates, the lateral-direction confining guide rail, and the lateral-direction confining bearing-element mounting plates. Only required are the adjustment of the horizontality of the vertical-direction confining guide assembly and the adjustment of the verticality of the lateral-direction confining guide assembly. Thus, the adjustment is very easy.

(3) The three-stage structure of the vertical-direction confining guide assembly avoids deformation of the bearing-element mounting plate.

(4) Use of a semi-floating bearing element made of ceramic avoids generation of particle scattering at the time of sliding movement.

(5) Use of a static-pressure bearing element made of a porous material assures high-bearing rigidity (approx. 1.5 times higher) and a reduced flow rate (approx. one-tenth), as compared with a conventional type bearing assembly having similar-size bearing elements such as disclosed in U.S. Pat. No. 4,448,460.

While the invention has been described with reference to the structures disclosed herein, it is not confined to the details set forth and this application is intended to cover such modifications or changes as many come within the purposes of the improvements or the scope of the following claims.

What is claimed is:

1. A movement guiding device, comprising:
   a guiding member having first and second surfaces which are in a back-to-back relation;
   a supporting member extending so as to substantially embrace said guiding member, said supporting member having (i) a third surface opposed to the first surface of said guiding member, (ii) a fourth surface opposed to the second surface of said guiding member and (iii) a fifth surface which is in a back-to-back relation with the fourth surface of said supporting member;
   a stationary member on which said guiding member is fixedly provided, said stationary member having a sixth surface opposed to the fifth surface of said supporting member;
   a first fluid bearing element provided on the third surface of said supporting member opposed to the first surface of said guiding member;
   a second fluid bearing element provided on the fourth surface of said supporting member opposed to the second surface of said guiding member; and
   a third fluid bearing element provided on the fifth surface of said supporting member opposed to the sixth surface of said stationary member, said third fluid bearing element being effective to prevent deformation of at least a portion of said supporting member in the neighborhood of the fourth and fifth surfaces thereof due to the effect of said second fluid bearing element.

2. A device according the claim 1, wherein each of said first, second and third fluid bearing elements is arranged so as to discharge fluid toward a surface opposed to the surface on which it is provided.

3. A device according to claim 1, wherein said supporting member includes a table adapted to carry thereon a workpiece which is to be guidingly moved.

* * * * *

UNITED STATES PATENT AND TRADEMARK OFFICE
CERTIFICATE OF CORRECTION

PATENT NO. : 4,744,675                   Page 1 of 2

DATED : May 17, 1988

INVENTOR(S) : SHIGEO SAKINO, ET AL.

It is certified that error appears in the above-identified patent and that said Letters Patent is hereby corrected as shown below:

ON THE TITLE PAGE:

<u>AT [30] IN FOREIGN APPLICATION PRIORITY DATA</u>

Add --Jan. 12, 1987   [JP]   62-005826--.

<u>COLUMN 1</u>

Line 22, "large scaled" should read --large-scale--.

<u>COLUMN 2</u>

Line 39, "parpendicularity" should read --perpendicularity--.

<u>COLUMN 3</u>

Line 25, "a support" should read --a prior art support--.
    Line 28, "prior art" should read --of a--.

<u>COLUMN 4</u>

Line 20, "are" should read --is--.
    Line 21, "here" should read --their front surfaces--.

<u>COLUMN 5</u>

Line 9, "an" should be deleted.
    Line 64, "in" should be deleted.

UNITED STATES PATENT AND TRADEMARK OFFICE
CERTIFICATE OF CORRECTION

PATENT NO. : 4,744,675
DATED : May 17, 1988
INVENTOR(S) : SHIGEO SAKINO, ET AL.

It is certified that error appears in the above-identified patent and that said Letters Patent is hereby corrected as shown below:

COLUMN 6

Line 25, "contributable" should read --contributory--.
Line 66, "scatter" should read --scattering--.

COLUMN 7

Line 2, "an air" (first occurrence) should read --air--.
Line 47, "errors" should read --and errors--.

COLUMN 9

Line 18, "many" should read --may--.

Signed and Sealed this

Thirty-first Day of January, 1989

Attest:

DONALD J. QUIGG

*Attesting Officer*   *Commissioner of Patents and Trademarks*